Patented Sept. 6, 1927.

1,641,326

UNITED STATES PATENT OFFICE.

WALTER M. FARNSWORTH, OF CANTON, OHIO, ASSIGNOR TO CENTRAL ALLOY STEEL CORPORATION, OF MASSILLON, OHIO, A CORPORATION OF NEW YORK.

PROCESS OF REMELTING CHROMIUM STEEL SCRAP.

No Drawing. Application filed August 24, 1926. Serial No. 131,312.

This invention relates to the remelting in an electric furnace of high-chromium, low-carbon, steel scrap of the type known as "rustless iron."

An object of the invention is to so control the remelting of steel scrap of this type, that there will be no substantial lowering of the chromium content or increase of the carbon content during the operation of remelting.

This and other objects of the invention will be in part obvious and in part pointed out in the course of the following description of the process and the factors controlling the same.

It is well known that in the case of ordinary chromium, chrome-nickel, and chrome-vanadium steel scrap of low and medium carbon content (containing .20 to 1.10% carbon, and .35 to 1.25% chromium), it is possible to remelt this scrap in an electric furnace without any appreciable loss of chromium, provided that (1) the oxidizing period is avoided by the addition of suitable reducing agents such as ferro-silicon, or that (2) such oxidizing slag as is formed, is permitted to remain in the furnace, and converted into a reducing slag at the conclusion of the heat.

In case (1) where the oxidizing slag is avoided, the final product always contains more carbon than was present in the initial scrap charge, although the increase may be practically negligible when the carbon content is .80% and above. This increase in carbon is brought about by unavoidable transfer of carbon into the metal bath from one of a number of outside sources, among which are the carbon electrodes.

In case (2) where the oxidizing slag is allowed to remain in the furnace and converted into a reducing slag at the conclusion of the heat, by additions of ferro-silicon, calcium carbide, coke, etc., it is possible under favorable circumstances to finish with a lower carbon content than that in the initial charge, but such a procedure is not always advisable on account of the high slag volume which is built up.

Numerous attempts have hitherto been made to remelt low-carbon, high-chromium steel scrap of the type designated as "stainless steel" or "rustless iron," but in general the procedure has been to melt the scrap under oxidizing conditions and to maintain the steel for a greater or less period beneath an oxidizing slag in an attempt to eliminate the carbon picked up during melting or at least to prevent any subsequent increase of carbon. In these attempts it has been the practice at times to add substantial quantities of iron ore and mill scale, or of chrome ore, in order to increase the per cent of reducible oxides in the slag, with a view to increasing its oxidizing power with respect to carbon.

None of these expedients, have however, accomplished their purpose, in every case the carbon content of the bath increased with comparative rapidity up to .16 to .20%, in spite of the presence of the so-called "oxidizing slag", while at the same time the chromium content of the metal decreased to a relatively low value. For instance, in the case of a charge of rustless iron scrap containing initially 0.08% carbon and 16.50 to 18.50% chromium, the chromium content fell to 12% in the course of such an operation, while the carbon simultaneously increased to .20%.

When this oxidizing slag is removed and a slag of the reducing type built up by the usual method, the metal bath continues to pick up carbon at an appreciable rate.

I have discovered that the behavior of rustless iron scrap during remelting is distinctly and radically different from that of ordinary chromium alloy steels of the type hereinbefore mentioned, and that the melting of this scrap must be conducted under conditions which are decidedly unique for the purpose in hand. Contrary to the generally accepted belief, I have found that rustless iron in the molten state is subject to carbon contamination in the electric furnace to an almost negligible degree, provided the remelting and finishing of the iron are conducted under reducing conditions. At the same time the loss of chromium may thereby be avoided or reduced to a very low figure.

The steel scrap usually employed in the practice of this invention, has the following range of analysis:

Carbon, .06 to .15%; manganese, .20 to .80%; sulphur, under .03%; phosphorus, under .03%; chromium, 11 to 18.5%; silicon, .20 to 1.50%.

The furnace in which the remelting is carried on, is basic lined and preferably of the Heroult type, utilizing three-phase current, and having a secondary voltage range, available at the electrodes, of 110 to 180 volts.

*Example.*

Fifteen thousand pounds (15,000) of steel scrap having an approximate analysis of .08 carbon; .30 manganese; .02 sulphur; .02 phosphorus; 17% chromium; and .85 silicon was charged into the furance. Half of a mixture of 600 lbs. of burnt lime and 90 lbs. of crushed ferro-silicon (containing 50% silicon) was mixed in with the scrap during the charging of the latter, and the other half of this mixture was placed around and under the electrodes.

As soon as charging was completed, the highest available voltage (180 volts) was used in order to keep the electrodes as far as possible away from the scrap. The charge melted down in one hour and twenty minutes after the power was turned on, and the voltage at this point was decreased to 110 volts. A sample was then taken for analysis.

Four hundred (400) pounds of burnt lime mixed with 60 lbs. of crushed ferro-silicon (containing 50% silicon) was then spread on the bath at intervals, while awaiting the results of the analysis. The slag formed by the addition of the burnt lime and ferro-silicon appeared white. The analysis which was received 35 minutes after the test sample was taken showed .10 carbon; .35 manganese; and .23 silicon.

The particular order for which this heat was made, called for a silicon, molybdenum, and copper content, with a chromium content slightly higher than that present in the initial scrap charge. The following additions were therefore made: 100 lbs. of ferrochromium (containing 73% chromium and less than .10 carbon); 56 lbs. of ferro-silicon (containing 80% silicon); 65 lbs. of approximately pure copper; and 25 lbs. of calcium molybdate (containing 42% of molybdenum). The bath was stirred following these additions, and the heat was tapped twenty minutes after making the additions. The total time for the heat was two hours and forty five minutes, and the final analysis was as follows: .10 carbon; .35 manganese; .02 phosphorus; .016 sulphur; .94 silicon; 17.15% chromium; .07 molybdenum; and .42 copper.

It should be particularly noted that the novelty of this process resides in remelting under strongly reducing conditions, in order to avoid an increase in the carbon content of the metal bath. In fact it would appear that rustless iron picks up carbon from its electric furnace environment, largely due to the presence of oxidizing conditions. To just what particular condition this pick-up in carbon may be attributed, I am not entirely certain. It may possibly be due to some reaction between the carbides present in the molten steel and the iron oxides (or chromium oxide) contained in the slag. This unusual phenomenon is certainly not met with in the remelting of any other type of steel with which I am familiar.

Although the invention has been particularly stated as adapted to the remelting of chromium steels, it is to be understood that the process is equally well adapted for chromium steels containing varying amounts of other alloying metals such as copper, molybdenum, nickel, vanadium, tungsten, or titanium.

Claims:
1. In a process of remelting high chromium, low carbon, steel scrap, to obtain a product having substantially the same chromium and carbon content as the initial scrap, the step which consists in adding an amount of ferrosilicon to the charge at the beginning of the melting down period, which is sufficient to prevent the absorption of carbon in the bath during the melt-down by the maintenance of strongly reducing conditions.

2. In a process of remelting high chromium, low carbon, steel scrap, to obtain a product having substantially the same chromium and carbon content as the initial scrap, the steps which consist in adding an amount of ferrosilicon to the charge at the beginning of the melting down period, which is sufficient to prevent the absorption of carbon in the bath during the melt-down by the maintenance of strongly reducing conditions, and adding more ferrosilicon to the bath after the melt-down to prevent recarburization of the molten steel at subsequent stages in the process.

3. In a process of remelting high chromium, low carbon, steel scrap, to obtain a product having substantially the same chromium and carbon content as the initial scrap, the step which consists in adding ferrosilicon to the charge at the beginning of the melting down period, in the proportion of about 10 to 15 lbs. per ton of scrap.

4. In a process of remelting high chromium, low carbon, steel scrap, to obtain a product having substantially the same chromium and carbon content as the initial scrap, the steps which consist in adding ferrosilicon to the charge at the beginning of the melting down period, in the proportion of about 10 to 15 lbs. per ton of scrap, and adding ferrosilicon to the bath after the melt-down in the proportion of about 5 to 10 lbs. per ton of steel.

5. In a process of remelting alloy steel scrap containing 11% to 18.5% chromium and less than .15% carbon, to obtain a product having substantially the same chromium and carbon content as the initial scrap, the step which consists in adding an amount of ferrosilicon to the charge at the beginning of the melting down period, which is sufficient to prevent the absorption of carbon in the bath during the melt-down by the maintenance of strongly reducing conditions.

6. In a process of remelting alloy steel scrap containing 11% to 18.5% chromium and less than .15% carbon, to obtain a product having substantially the same chromium and carbon content as the initial scrap, the steps which consist in adding an amount of ferrosilicon to the charge at the beginning of the melting down period, which is sufficient to prevent the absorption of carbon in the bath during the melt-down by the maintenance of strongly reducing conditions, and adding more ferrosilicon to the bath after the melt-down to prevent recarburization of the molten steel at subsequent stages in the process.

7. In a process of remelting alloy steel scrap containing 11% to 18.5% chromium and less than .15% carbon, to obtain a product having substantially the same chromium and carbon content as the initial scrap, the step which consists in adding ferrosilicon to the charge at the beginning of the melting down period, in the proportion of about 10 to 15 lbs. per ton of scrap.

8. In a process of remelting alloy steel scrap containing 11% to 18.5% chromium and less than .15% carbon, to obtain a product having substantially the same chromium and carbon content as the initial scrap, the steps which consist in adding ferrosilicon to the charge at the beginning of the melting down period, in the proportion of about 10 to 15 lbs. per ton of scrap, and adding ferrosilicon to the bath after the melt-down in the proportion of about 5 to 10 lbs. per ton of steel.

In testimony whereof I affix my signature.

WALTER M. FARNSWORTH.